(12) United States Patent
Guionneau

(10) Patent No.: US 12,526,267 B2
(45) Date of Patent: Jan. 13, 2026

(54) METHOD FOR CREATING A COMMUNICATION CHANNEL BETWEEN A LOCATION APPLICATION AND AN SAAS APPLICATION, AND METHOD AND SYSTEM FOR COMMUNICATING BETWEEN THE APPLICATIONS

(71) Applicant: BULL SAS, Les Clayes-sous-Bois (FR)

(72) Inventor: Christophe Guionneau, Grenoble (FR)

(73) Assignee: BULL SAS, Les Clayes-sous-Bois (FR)

( * ) Notice: Subject to any disclaimer, the term of this patent is extended or adjusted under 35 U.S.C. 154(b) by 276 days.

(21) Appl. No.: 18/149,621

(22) Filed: Jan. 3, 2023

(65) Prior Publication Data
US 2023/0216841 A1 Jul. 6, 2023

(30) Foreign Application Priority Data
Jan. 5, 2022 (EP) .................................... 22305005

(51) Int. Cl.
*H04L 9/40* (2022.01)
*H04L 67/10* (2022.01)
(52) U.S. Cl.
CPC .......... *H04L 63/0815* (2013.01); *H04L 67/10* (2013.01)
(58) Field of Classification Search
CPC ............. H04L 63/0281; H04L 63/0428; H04L 63/0815; H04L 67/02; H04L 67/10; H04L 67/14
See application file for complete search history.

(56) References Cited

U.S. PATENT DOCUMENTS

| | | | |
|---|---|---|---|
| 9,716,701 B1 | 7/2017 | Wang et al. | |
| 2005/0076126 A1* | 4/2005 | Knight | H04L 63/0281 709/227 |
| 2015/0381710 A1* | 12/2015 | Kish | H04L 69/162 709/201 |
| 2018/0131685 A1* | 5/2018 | Sridhar | H04L 9/3226 |
| 2020/0153818 A1 | 5/2020 | Chauhan | |

OTHER PUBLICATIONS

European Search Report issued in EP22305005.5, dated Jun. 29, 2022 (5 pages).

* cited by examiner

*Primary Examiner* — Gil H. Lee
(74) *Attorney, Agent, or Firm* — ARC IP Law, PC; Joseph J. Mayo

(57) ABSTRACT

The invention relates to a method for creating a communication channel between a local application executed in a local network and a remote SaaS application. The method includes generating an SSL access point and associating the SSL access point to a communication port with the SaaS application. The method also includes generating, by a proxy, a local IDAAS proxy, located in the local network, and an SSL connection associated with the SSL access point and associated with a port for communicating with the local application in the local network. The invention also relates to a method and a system for communicating between the local application and the SaaS application.

11 Claims, 2 Drawing Sheets

METHOD FOR CREATING A COMMUNICATION CHANNEL BETWEEN A LOCATION APPLICATION AND AN SAAS APPLICATION, AND METHOD AND SYSTEM FOR COMMUNICATING BETWEEN THE APPLICATIONS

BACKGROUND OF THE INVENTION

Field of the Invention

Embodiments of the invention relate to a method for creating a communication channel between a local application, in particular hosted on a local server located in a computer network, a so-called local network, and an Application as a Service, so-called SaaS application, hosted in the cloud and in particular on an application server located outside said computer network. At least one embodiment of the invention also relates to a method and system for communicating between said local and SaaS applications.

The field of one or more embodiments of the invention is the field of communication between, on the one hand, a local application hosted within a computer network and, on the other hand, an application in SaaS modes hosted on a server located outside of said computer network.

Description of the Related Art

Companies increasingly use "as a service" applications hosted in the cloud, called SaaS applications or web applications or even remote applications, in this document. These SaaS applications require user authentication. For various reasons, companies have transferred identity and access management to an identity-as-a-service (IDAAS) provider, hosted in the cloud, on a server external to the company's computer network, and called an IDAAS ("IDentity As A Service") server.

There are also applications located in the company's computer network, called "local applications" in this document. Access to these applications is managed by an identity server located in the local network.

However, there are needs to make a SaaS application communicate with a local application. A first solution consists in using a VPN, but this solution is very intrusive and difficult to implement, in particular due to the linking of separate networks without consistent addressing ranges. An alternative solution would be to transfer the IDAAS server into the local network but this is incompatible with the very use of the IDAAS server.

BRIEF SUMMARY OF THE INVENTION

One aim of one or more embodiments of the invention is to solve at least one of the above-mentioned shortcomings.

Another aim of at least one embodiment of the invention is to propose a solution for connecting a local application with a SaaS application.

It is also an aim of one or more embodiments of the invention to propose a solution allowing to connect a local application with a SaaS application, in a simpler, less cumbersome and less instructive way than the current solutions.

One or more embodiments of the invention makes it possible to achieve at least one of the aforementioned aims with a method for creating a communication channel between, on the one hand, a local application hosted on a so-called local server, in a computer network, so-called local network, and on the other hand, an application as a service, so-called SaaS application, hosted on an application server remote from said local network, via a private network, so-called IDAAS network, comprising an identity as a service server, so-called IDAAS server, used to regulate access to said SaaS application, said local network communicating with said IDAAS network via the Internet network, said method comprising the following steps:

generating, in said IDAAS network, an SSL access point and associating said access point to a port for communicating with said SaaS application, in said IDAAS network; and generating, by a proxy, so-called local IDAAS proxy, located in said local network, an SSL connection associated:

with said SSL access point in said IDAAS network, and with a port for communicating with said local application in said local network.

Thus, in order to make the local application communicate with the SaaS application, at least one embodiment of the invention proposes to use a proxy in the local network, and to create, by this proxy, an SSL connection. This SSL connection is associated, in particular exclusively, with a communication port corresponding to the local application and making it possible to communicate with the local application in the local network. Furthermore, this SSL connection is used to access, preferentially exclusively, an SSL access point created in the IDAAS network. The SSL access point created in the IDAAS network is itself associated, in particular exclusively, with a port for communicating with the SaaS application in said IDAAS network. Thus, at least one embodiment of the invention makes it possible to obtain a communication channel between the local application and the SaaS application in a simpler and less cumbersome way than the current solutions.

In addition, in one or more embodiments, the proxy, respectively the SSL access point, may be executed by a device or a server already present in the local network, respectively the IDAAS network: which makes it possible to implement the one or more embodiments of the invention without the use of an additional device and without modifying the architecture of the local network, respectively of the IDAAS network. Thus, at least one embodiment of the invention may be implemented with reduced costs and without significant intrusion in the networks concerned.

In addition, in one or more embodiments of the invention, the communication between the local application and the SaaS application is always initiated by the local application which has the initiative of sending, or not sending, data to the SSL access points. Thus, the security of the local network is completely backed up while enabling local and SaaS applications to communicate with each other.

At least one, in particular each, communication port may be a TCP port.

The application server may be a server located in the IDAAS network.

Alternatively, the application server may not be in the IDAAS network. In this case, the application server has a connection, and privileges, which enable it to reach the IDAAS server, for example via the Internet network.

The function of the SSL connection is to encrypt the outgoing data, that is the data transmitted by the local application to the SaaS application, and to decrypt the incoming data, that is the data from the SaaS application to the local application.

Advantageously, in the local network, the local IDAAS proxy may be implemented in software form, for example by a process executed on a server forming part of the local network.

In one or more embodiments, the local network may further comprise an Internet proxy located between the Internet network and the local IDAAS proxy.

In this case, the SSL connection generated for, and associated with, the local application may be of the HTTP-CONNECT type, for tunneling encrypted data in both directions and passing through said Internet proxy of said local network. Indeed, in this case, the local IDAAS proxy asks the Internet proxy of the local network to create a TCP tunnel to the desired destination, namely the access point whose IP address is known. The Internet proxy of the local network then creates a tunnel enabling the local IDAAS proxy to communicate with the SSL access point located in the IDAAS network.

Advantageously, the method according to one or more embodiments of the invention may comprise, before the step of generating the SSL connection, a step of starting the local IDAAS proxy and configuring said local IDAAS proxy with a configuration file stored within the local network.

In this case, at the start of the method, the local IDAAS proxy is started. In particular, the process corresponding to the local IDAAS proxy is started. Then, the local IDAAS proxy reads a minimum configuration in a configuration file stored locally. This local configuration file has previously been obtained from the IDAAS network, and in particular from the IDAAS server or from an administration component of the IDAAS network.

According to at least one embodiment, the minimum configuration file may comprise:
- a name and/or an address of an SSL access point server, in the IDAAS network and configured to create the SSL access point(s) in the IDAAS network,
- a password, or a key, for identifying itself with the IDAAS server, and
- optionally a proxy URL on the IDAAS network side, if applicable.

Thus, when starting, the local IDAAS proxy my be configured with a minimum configuration while waiting for an SSL connection to be generated for each local application.

Advantageously, the method according to at least one embodiment of the invention may further comprise, before the step of generating the SSL connection, a step of retrieving, by the local IDAAS proxy, data relating to the SSL access point from the IDAAS network.

In this case, the local IDAAS proxy may obtain, from the access point server, a detailed configuration file indicating the SSL access point(s) that must be used for each local application. In other words, this file indicates to the local IDAAS proxy which SSL access point to use for which local application.

For example, the detailed configuration file may comprise for each application:
- a URL address of the access point, and
- optionally an SSL certificate to be used.

This detailed configuration file may be obtained periodically by the local IDAAS proxy at a given frequency, in order to take into account any modifications.

The SSL certificate is not required if the SSL access point has a certificate verifiable with the certification authorities already available on the system where the proxy runs. Nevertheless, it may be necessary if the certificate is not issued by an official/known/verifiable certificate authority. The certificate present in the configuration will then be compared with the certificate obtained in the SSL communication with the SSL access point. This technique is called "certificate pinning"; it makes it possible to dispense with the use of certification authorities).

However, in at least one embodiment, the certificate of the configuration could be used, not to verify the identity of the server, but to identify the client part.

Therefore, the communication between the/each access point and the local IDAAS proxy may use:
- either an SSL certificate to be used by the local IDAAS proxy, to authenticate itself with the SSL access point;
- or a certificate for the SSL access point and that must be verified when establishing the connection Advantageously, in at least one embodiment, the local IDAAS proxy opens an SSL connection for the local application, in particular each local application, and maintains said SSL connection open.

As indicated above, each SSL connection is associated with an IP address of the SSL access point and a communication port internal to the local network associated with, and preferentially dedicated to, the local application. When the local application wishes to communicate with the SaaS application, it transmits these data on the communication port in question. The local IDAAS proxy retrieves this data and encrypts them in accordance with the SSL certificate of the SSL connection. The encrypted data is then sent to the SSL access point associated with the SSL connection.

According to one or more embodiments, the SSL access point may be created between an Internet proxy, so-called remote IDAAS proxy, of the IDAAS network and the Internet network. In this case, the communication port associated with the access point is a port of said remote IDAAS proxy, itself associated with a port corresponding to the SaaS application.

In other words, in this case, the IDAAS network comprises an Internet proxy, called remote IDAAS proxy. This remote IDAAS proxy conventionally creates an association between two communication ports; one on the side of the Internet network and associated with the SSL access point and the other on the side of the SaaS application and associated with the SaaS application.

Thus, data transmitted by the local application pass through the SSL connection to the SSL access point. The latter decrypts these data and transmits them to a first port of the remote IDAAS proxy associated therewith. The remote IDAAS proxy receives the decrypted data on the first port and transmits them to a second port associated with, and preferentially dedicated to, the SaaS application such that the data are received by said SaaS application.

The data transmitted by the SaaS application to the local application flow in the reverse direction, that is from the SaaS application to the second port of the remote IDAAS proxy, then from the first port of the remote IDAAS proxy to the SSL access point. Here, this data is encrypted in accordance with the SSL certificate and transmitted to the local application via the SSL connection.

According to at least one embodiment of the invention, a method is proposed for establishing communication between a local application hosted on a server, so-called local server, in a computer network, so-called local network, with an application as a service, so-called SaaS application, hosted on an application server remote from said local network, via a private network, so-called IDAAS network, comprising an identity as a service server, so-called IDAAS server, used to regulate access to said SaaS application, said local network communicating with said IDAAS network via the Internet network, said method comprising the following steps:

creating a communication channel between said applications by the method according to one or more embodiments of the invention, and exchanging data between said applications through said communication channel.

According to at least one embodiment of the invention, a communication system is proposed between a local application hosted on a so-called local server, in a computer network, so-called local network, and an application as a service, so-called SaaS application, hosted on an application server remote from said local network, through a private network, so-called IDAAS network, comprising an identity as a service server, so-called IDAAS server, used to regulate access to said SaaS application, said local network communicating with said IDAAS network via the Internet network, said system comprising:

an access point generator, in said IDAAS network, for generating an SSL access point and associating said access point to a communication port with said SaaS application in said IDAAS network; and a proxy, a so-called local IDAAS proxy, in said local network, for generating an SSL connection associated: to said SSL access point in said IDAAS network, and to a port for communicating with said local application in said local network.

According to one or more embodiments, the local network may comprise an Internet proxy located between the Internet network and the local IDAAS proxy. In this case, the SSL connection generated for the local application may be of the HTTP-CONNECT type, for tunneling encrypted data in both directions and passing through said Internet proxy of said local network.

According to one or more embodiments, the SSL access point may be located between an Internet proxy, so-called remote IDAAS proxy, of the IDAAS network and the Internet network. In this case, the communication port associated with said SSL access point is a port of said remote IDAAS proxy.

BRIEF DESCRIPTION OF THE DRAWINGS

Other benefits and features shall become evident upon examining the detailed description of at least one embodiment, and from the enclosed drawings in which.

DETAILED DESCRIPTION OF THE INVENTION

It is clearly understood that the one or more embodiments that will be described hereafter are by no means limiting. In particular, it is possible to imagine variants of at least one embodiment of the invention that comprise only a selection of the features disclosed hereinafter in isolation from the other features disclosed, if this selection of features is sufficient to confer a technical benefit or to differentiate the one or more embodiments of the invention with respect to the prior state of the art. This selection comprises at least one preferably functional feature which lacks structural details, or only has a portion of the structural details if that portion only is sufficient to confer a technical benefit or to differentiate the one or more embodiments of the invention with respect to the prior state of the art.

In the figures, the same reference has been used for the features that are common to several figures.

Figure 1:
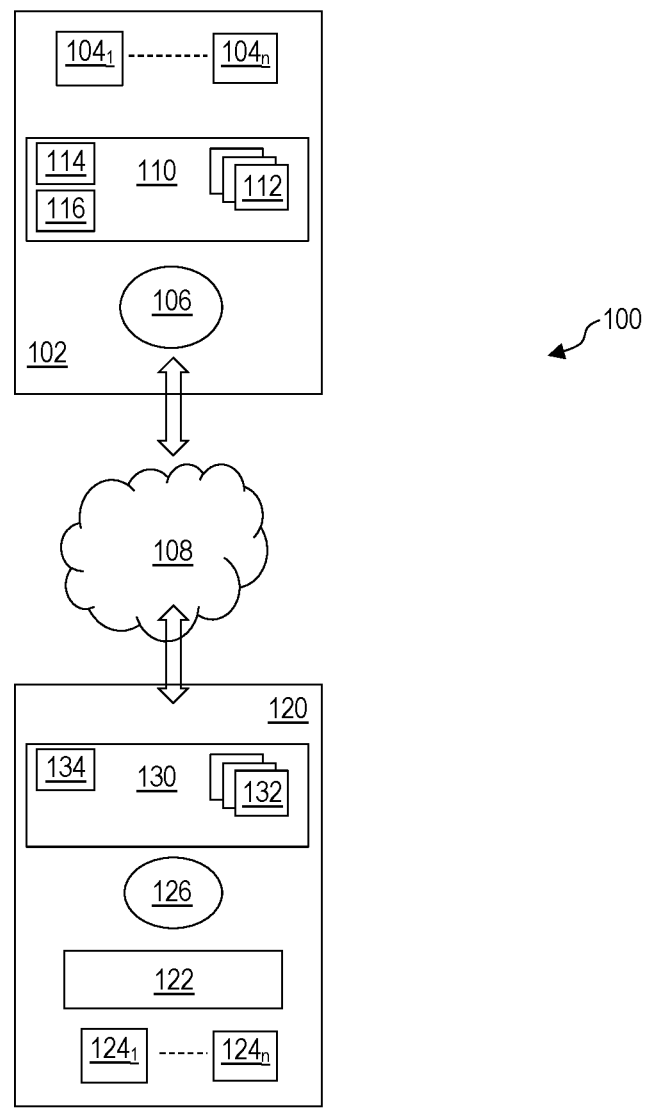
FIG. 1 is a schematic depiction of a communication system according to one or more embodiments of the invention.

FIG. 1 is a schematic depiction of a communication system according to one or more embodiments of the invention.

The system 100, shown in FIG. 1, may be implemented to enable a local application, located in a local computer network, to communicate with an SaaS application located outside said local computer network, via an IDAAS network comprising an IDAAS server regulating access to said SaaS application.

The local computer network can, for example, be a company network, a home network, or any other computer network.

FIG. 1 shows the local network 102 in which local applications $104_1$-$104_n$ are hosted, with n≥1. Each local application $104_i$ may be accessed in the local network 102, without leaving said local network 102. Access to each application may be regulated by an identity server (not shown) within said local network 102.

Optionally, in at least one embodiment, the local network 102 comprises an Internet proxy 106 enabling the devices of the local network 102 to securely access the Internet network 108.

FIG. 1 further represents a network 120, the so-called IDAAS network, remote from said local network 102, which can communicate with said local network 102 via the Internet network 108.

The IDAAS network 120 comprises an IDAAS server 122 that manages access to the applications in SaaS mode, the so-called SaaS applications, through processes $124_1$-$124_n$, each dedicated to an SaaS application. Each SaaS application may be hosted in the I DAAS network 122. Alternatively, in at least one embodiment, each SaaS application may be hosted in a server, or even in the cloud, outside of said IDAAS network 122. In all cases, the IDAAS server 122 can exchange data with each SaaS application via the process $124_i$ dedicated thereto.

The network 120 further comprises, optionally, an Internet proxy 126 enabling the IDAAS server 122, as well as the other devices of the IDAAS network to communicate with devices located outside said IDAAS network 120 via the Internet network 108.

According to at least one embodiment of the invention, the system 100 comprises, in the IDAAS network 120, an SSL access point server 130, configured to generate an SSL access point 132 for each SaaS application. Each SSL access point 132:

comprises a URL address for accessing said SSL access point from the Internet network 108, and is associated, in the IDAAS network 120, with a communication port with the process $124_i$ dedicated to communicating with the SaaS application.

In the example shown, since the IDAAS network 120 comprises an Internet proxy 126 between the IDAAS server 122 and each SSL access point 132, each SSL access point 132 is associated with a first communication port of said Internet proxy 126, said first port itself being associated with a second port of said Internet proxy 126 itself associated with the process $124_i$. In the case where the IDAAS network 120 does not comprise the Internet proxy 126, then each access point 132 can be directly associated to a port for communicating with the process $124_i$ of the SaaS application to which said SSL access point 132 is associated.

Each communication port may be a TCP port.

The SSL access point server 130 is configured with a configuration file 134 wherein each SSL access point is associated with a communication port assigned to an SaaS application. This file is kept and updated in the IDAAS network 120, for example by an administration component of the IDAAS network 120.

The system 100 further comprises, in the local network 102, a proxy 110 called a local IDAAS proxy, configured to generate SSL connections 112 between each local application $104_i$ and an SSL access point 132 located in the IDAAS network 120. In particular, each SSL connection 112 is associated with:

a communication port with a local application $104_i$, in the local network 110, and a known SSL access point 132, for example by virtue of its URL address, and located in the IDAAS network 120.

The local IDAAS proxy 110 is first configured with a minimum configuration file 114. Next, each SSL connection 112 is generated by means of data contained in a configuration file 116, received from the IDAAS network 120, and in particular from an administration component of the IDAAS network 120. The minimum configuration file 114 may comprise a URL address enabling the local IDAAS proxy to download the configuration file 116 from the IDAAS network 120 for example.

The configuration file 116, respectively the configuration file 114, is kept and updated by said administration component. It may be downloaded periodically to take into account any changes.

Figure 2:
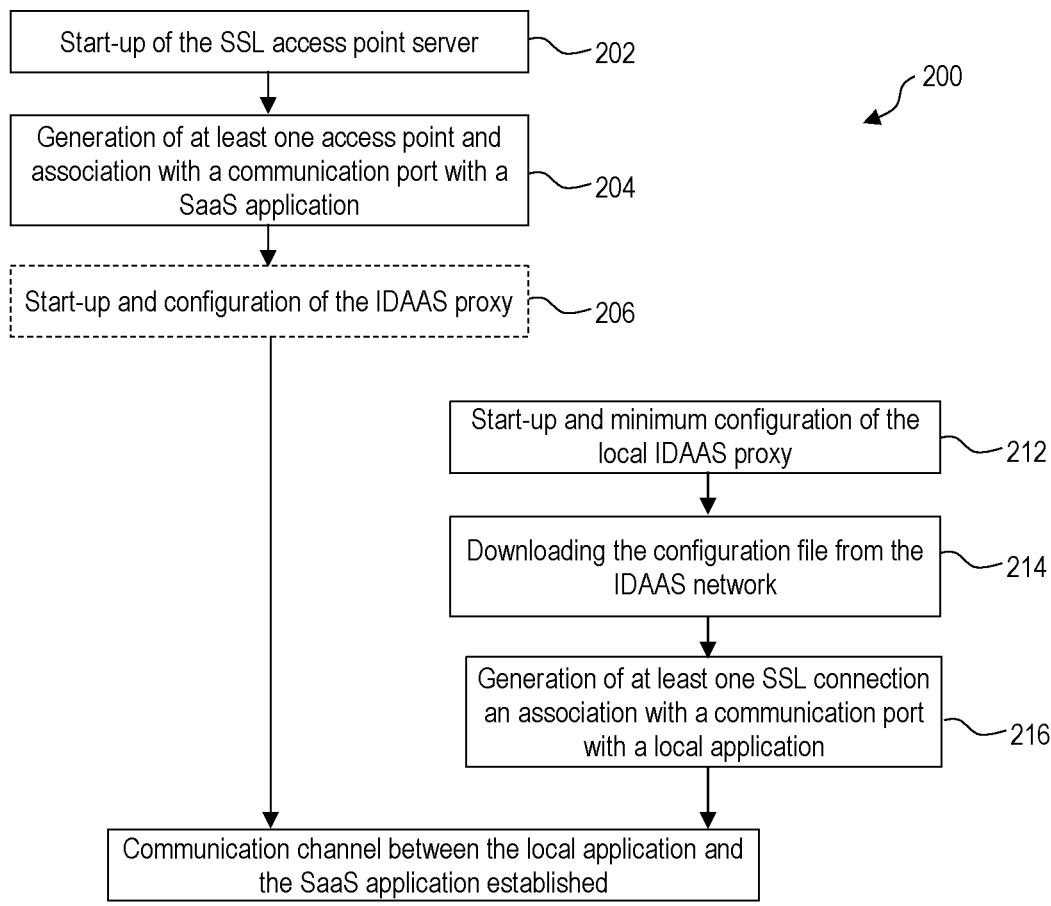
FIG. 2 is a schematic representation of a method for creating a communication channel between a local application and an SaaS application, according to one or more embodiments of the invention.

FIG. 2 is a schematic representation of a method according to one or more embodiments of the invention for creating a communication channel between a local application and an SaaS application.

The method 200, shown in FIG. 2, may be implemented in a system according to one or more embodiments of the invention, and in particular in the system 100 of FIG. 1.

The method 200 comprises a step 202 of starting a generator, or a server, of SSL access points at the IDAAS network, i.e. in the network in which the IDAAS server is located. The role of this access point server is to generate an SSL access point for each SaaS application, enabling communication with said SaaS application from outside the IDAAS network.

In a step 204, the SSL access point server generates, for each SaaS application, an SSL access point. The generation of the SSL access points is carried out according to data contained in a configuration file stored in the IDAAS network. This configuration file is kept, and is updated, by an administration component of the IDAAS network. This configuration file indicates for each SaaS application:

the URL address of the SSL access point to be generated, and the communication port, in particular TCP, in the IDAAS network, for communicating with the SaaS application.

The port for communicating with an SaaS application may be a communication port of an application server located in the IDAAS network. Alternatively, in at least one embodiment, the port for communicating with an SaaS application may be a first communication port of a proxy, called an IDAAS proxy, located in the IDAAS network, as in the example of FIG. 1. In this case, the method 200 further comprises a step 206, that is optional, of starting and configuring said IDAAS proxy. The configuration of the IDAAS proxy is carried out with a configuration file. This file may be provided and updated by the administration component of the IDAAS network. This configuration file of the IDAAS proxy indicates for each first communication port of said IDAAS proxy associated with an SSL access point, a second port for communicating with the SaaS application to which this SSL access point is associated. Thus, the IDAAS proxy receives data over the first communication port from the SSL access point and intended for the SaaS application, and transmits them to said SaaS application via the second communication port.

Advantageously, in at least one embodiment, the configuration file of the IDAAS proxy may be consulted periodically to take into account a modification or an update to said file, and thus update the SSL access points.

Steps 202-206 are carried out at the level of the IDAAS network.

The method 200 further comprises a step 212 of starting and configuring the local IDAAS proxy located in the local network, i.e. in the network where the local application is located. In particular, the local IDAAS proxy is started and configured with a minimum configuration by virtue of a minimum configuration file stored in the local network, and in particular in the device or the server executing said local IDAAS proxy. This minimum configuration file may be downloaded beforehand from the IDAAS network and in particular from an administration component of the IDAAS network. This minimum configuration file can, for example, indicate a URL address, or a name of a device, in the IDAAS network, from which a detailed configuration file may be downloaded that indicates the data for creating SSL connections associated with the SSL access points.

Then, in a step 214, the detailed configuration file is downloaded from the IDAAS network. The detailed configuration file indicates, for each SaaS application, the URL address of the SSL access point associated with the SaaS application, as well as the SSL certificate.

In a step 216, the local IDAAS proxy generates, for each local application, an SSL connection and associates this SSL connection:

on the one hand to the URL address of the SSL access point, in the IDAAS network, associated with the SaaS application, and on the other hand, to a communication port, in particular TCP, with the local application, in the local network.

Advantageously, in at least one embodiment, the detailed configuration file may be downloaded periodically to take into account a modification or an update to said file, and thus update the SSL connections.

Steps 212-216 are carried out at the local network.

Thus, after executing steps 202-206 on the IDAAS network side and steps 212-216 on the local network side, a secure SSL communication channel is established between the local application executed in the local network and an SaaS application executed on an application server located outside said local network.

It is understood that the SSL communication channel thus created enables bi-directional communication between the local and SaaS applications, at the initiative of the local application, and makes it possible to exchange data between said applications in a bi-directional manner.

Figure 3:
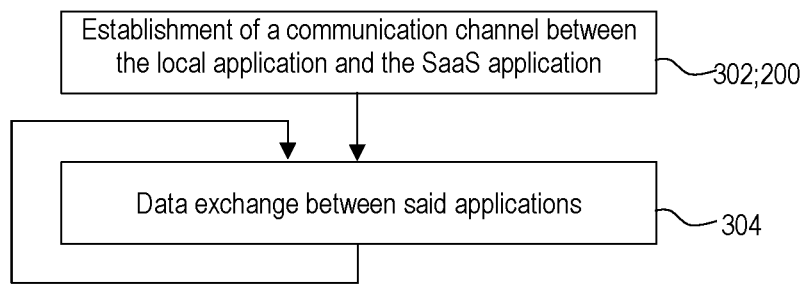
FIG. 3 is a schematic depiction of a communication method according to one or more embodiments of the invention.

FIG. 3 is a schematic representation of a method according to one or more embodiments of the invention for communicating between a local application and an SaaS application.

The method 300, shown in FIG. 3, may be implemented in a system according to one or more embodiments of the invention, and in particular in the system 100 of FIG. 1.

The method 300 comprises a step 302 of creating an SSL communication channel between the local application and the SaaS application by the method according to one or more embodiments of the invention for creating a communication channel between said applications, and in particular by the method 200 of FIG. 2.

The method 300 then comprises a step of exchanging data between said applications, at the initiative of the local application. Step 304 may be repeated as many times as desired.

In particular, when the local application wishes to transmit data to the SaaS application, said data are transmitted by said local application over the communication port associated with the SSL connection in the local network. These data are received by the local IDAAS proxy in the local network and are encrypted in accordance with the SSL certificate. Then, the encrypted data are transmitted to the SSL access point associated with the SSL connection, via the SSL connection, through the Internet proxy if applicable, then the Internet network, until the IDAAS network. The encrypted data are received, in the IDAAS network, by the SSL access point. The SSL access point decrypts the received data and transmits them to the port for communicating with the SaaS application, in the IDAAS network. When this communication port is a first port of an IDAAS proxy in the IDAAS network, the IDAAS proxy receives these data over said first port and retransmits them over a second port associated with the SaaS application. The decrypted data are transmitted, via the second port, either to the SaaS application, or to a process related to the SaaS application that transmits them.

If applicable, the data is transmitted from the SaaS application to the local application in the reverse direction, for example when the SaaS application responds to a request from the local application. In particular, the data are transmitted by the SaaS application and received on the second port of the IDAAS proxy, which redirects them to the first communication port. The data is then received by the SSL access point which encrypts them and transmits them, via the SSL connection, to the local network via the Internet network. The encrypted data are received by the local IDAAS proxy, optionally after having passed through the Internet proxy of the local network. The local IDAAS proxy decrypts the received data and transmits them in the local network to the local application via the port for communicating with said local application.

As indicated above, the use of an IDAAS proxy in the IDAAS network is optional. In this case, the data decrypted by the SSL access point are transmitted to the SaaS application, or to a process related to the SaaS application. Similarly, the data transmitted by the SaaS application are received by the SSL access point without passing through an IDAAS proxy in the IDAAS network.

In addition, the use of an Internet proxy in the local network is also optional. In this case, the data encrypted by the local IDAAS proxy in the local network are transmitted by said local IDAAS proxy to the Internet network. Similarly, the encrypted data transmitted by the SSL access point in the IDAAS network are received by the local IDAAS proxy without passing through an Internet proxy in the local network.

Of course, the examples described above are only given by way of specific examples and the one or more embodiments of the invention are not limited to these examples. Numerous variants can be envisaged for the examples given above without departing from the scope of the one or more embodiments of the invention as defined in the claims.

What is claimed is:

1. A method for creating a communication channel between a local application hosted on a local network in a computer network and a software as a service (SaaS) application hosted on an application server remote from said local network, via a private network comprising an identity as a service (IDAAS) network, wherein said method comprises:
generating, in said IDAAS network, an SSL access point and associating said SSL access point to a port that communicates with said SaaS application, in said IDAAS network,
wherein said IDAAS network comprises
an IDAAS server that is used to regulate access to said SaaS application, and
a remote IDAAS proxy associated with said SSL access point,
wherein said local network communicates with said IDAAS network via an Internet network; and
generating, by a proxy comprising a local IDAAS proxy located in said local network, an SSL connection associated with
said SSL access point in said IDAAS network, and
a port that communicates with said local application in said local network;
wherein the SaaS application communicates via the SSL access point associated therewith and does not directly communicate with said remote IDAAS proxy.

2. The method according to claim 1, wherein the local network comprises an Internet proxy located between the Internet network and the local IDAAS proxy, and wherein the SSL connection generated for the local application is an HTTP-CONNECT type connection that tunnels encrypted data in both directions and passes through said Internet proxy of said local network.

3. The method according to claim 1, further comprising, before said generating the SSL connection, starting the local IDAAS proxy and configuring said local IDAAS proxy with a configuration file stored within the local network.

4. The method according claim 1, further comprising, before said generating the SSL connection, retrieving, by the local IDAAS proxy, data relating to the SSL access point from the IDAAS network.

5. The method according to claim 1, wherein the SSL access point is created between an Internet proxy, comprising said remote IDAAS proxy of the IDAAS network, and the Internet network, wherein an access port associated with the SSL access point is a port of said remote IDAAS proxy that is associated with a port corresponding to the SaaS application.

6. The method according to claim 1, further comprising
creating a communication channel that communicates between said local application and said SaaS application, and
exchanging data between said local application and said SaaS application via said communication channel.

7. A communication system between a local application hosted on a local network in a computer network and a software as a service (SaaS) application that is hosted on an application server remote from said local network via a private network comprising an identity as a service (IDAAS) network that comprises an IDAAS server, wherein said communication system comprises:
- a generator of access points, in said IDAAS network, that generates an SSL access point and associates said SSL access point to a port to communicate with said SaaS application in said IDAAS network,
  - wherein said IDAAS server is used to regulate access to said SaaS application, wherein said local network communicates with said IDAAS network via an Internet network; and
- a proxy comprising a local IDAAS proxy, in said local network, that generates an SSL connection that is associated with
  - said SSL access point in said IDAAS network, and
  - a port that communicates with said local application in said local network,
    - wherein the SaaS application communicates via the SSL access point associated therewith and does not directly communicate with said remote IDAAS proxy.

8. The communication system according to claim 7, wherein the local network comprises an Internet proxy located between the Internet network and the local IDAAS proxy, and wherein the SSL connection for the local application is an HTTP-CONNECT type connection that tunnels encrypted data in both directions and passes through said Internet proxy of said local network.

9. The communication system according to claim 7, wherein the SSL access point is between an Internet proxy comprising a remote IDAAS proxy, of the IDAAS network, and the Internet network, and wherein an access port associated with said SSL access point is a port of said remote IDAAS proxy.

10. The method according to claim 1, wherein communication between the local application and the SaaS application is carried out through the IDAAS network.

11. The communication system according to claim 7, wherein communication between the local application and the SaaS application is carried out through the IDAAS network.

* * * * *